United States Patent [19]
Lowery et al.

[11] Patent Number: 5,153,165
[45] Date of Patent: Oct. 6, 1992

[54] PREPARATION OF ALKALINE EARTH OXIDE CATALYSTS

[75] Inventors: Richard E. Lowery, Muscatine, Iowa; Jim L. Wright, Bartlesville, Okla.

[73] Assignee: Phillips Petroleum Company, Bartlesville, Okla.

[21] Appl. No.: 697,559

[22] Filed: May 9, 1991

[51] Int. Cl.⁵ .................. B01J 37/04; B01J 21/04; B01J 21/06; B01J 23/04
[52] U.S. Cl. .................. 502/341; 502/243; 502/340
[58] Field of Search .................. 502/243, 340, 341

[56] References Cited

U.S. PATENT DOCUMENTS

| | | | |
|---|---|---|---|
| 3,425,792 | 2/1969 | Stephens | 502/242 X |
| 4,582,815 | 4/1986 | Bowes | 502/243 X |
| 4,684,760 | 8/1987 | Drake | 585/670 |
| 4,970,191 | 11/1990 | Schutz | 502/341 |
| 4,987,114 | 1/1991 | Suzukamo et al. | 502/341 |

Primary Examiner—W. J. Shine
Assistant Examiner—Douglas J. McGinty
Attorney, Agent, or Firm—Ryan N. Cross

[57] ABSTRACT

Preparation of alkali metal/alkaline earth metal oxide catalyst on a refractory metal oxide support by using at least one suitable organic or inorganic acid. Catalysts prepared by this method have and exhibit superior catalytic activity.

32 Claims, No Drawings

PREPARATION OF ALKALINE EARTH OXIDE CATALYSTS

BACKGROUND OF THE INVENTION

This invention relates to refractory metal oxide supported alkaline earth oxide catalysts.

A catalyst system comprising $MgO/Na_2O$ impregnated on an alumina support is known in the art as useful in the isomerization and disproportionation of olefins. The preparation of such a catalyst is also known in the art. However, because of the wide-spread use of this catalyst system, it has always been, and still is of interest to the petro-chemical industries to improve on the catalyst. Such improvements include but are not limited to discovering better and more economical processes for manufacturing the catalyst, and improving on its catalytic activity.

SUMMARY OF THE INVENTION

It is an object of this invention to provide a catalyst useful for the double bond isomerization of olefinic compounds.

It is a further object of this invention to provide a process for the production of an isomerization catalyst which results in reduced nitrous oxide emissions during catalyst preparation.

It is another object of this invention both to simplify the manufacturing process and to improve the catalytic activity of these types of catalyst.

In accordance with one embodiment of this invention, there is provided a process for preparing a catalyst comprising mixing an alkaline earth metal oxide source, an alkali metal oxide source, a refractory metal oxide support, at least one acid, and water to form a paste, extruding the thus-formed paste to form an extrudate, and thereafter drying the extrudate.

In accordance with another embodiment of the invention, there is provided a process for making a catalyst comprising mixing an alkaline earth metal oxide source and a refractory metal oxide support to form a mixture; mixing an alkali metal oxide source, at least one acid and water with the mixture to form a paste; extruding the thus formed paste to form an extrudate; drying the extrudate to form a dried extrudate; and calcining the dried extrudate to form a calcined extrudate.

In accordance with another embodiment of this invention, there is provided a catalyst product comprising an alkaline earth metal oxide and an alkali metal oxide on at least one refractory metal oxide support prepared by mixing the alkali metal oxide source, a refractory metal oxide support, at least one acid, and water to form a paste; extruding the thus-formed paste to form an extrudate; drying the extrudate to form a dried extrudate; calcining the dried extrudate to form a calcined extrudate; impregnating the calcined extrudate with an alkaline earth metal oxide source to form an impregnated extrudate; drying the impregnated extrudate to form a dried impregnated extrudate; and calcining the dried impregnated extrudate.

In accordance with another embodiment of this invention, there is provided a process for the isomerization of an aliphatic olefinic hydrocarbon feed which comprises contacting the olefinic hydrocarbon feed under isomerization conditions with the catalyst of the present invention.

In accordance with another embodiment of this invention, there is provided a process for the disproportionation of at least one olefin by contacting the at least one olefin with a disproportionation catalyst and the catalyst of the present invention.

DETAILED DESCRIPTION OF THE INVENTION

Generally speaking, the process for preparing the catalyst of this invention consists of mixing an acid, an alkali metal compound, an alkaline earth metal oxide, a refractory metal oxide support, and water in a vessel in appropriate quantities, times and order. The mixture is then extruded, dried, and calcined at suitable temperatures. While the extrudate can be dried at any suitable temperature and for any appropriate time, it is preferred to dry the mixture at from about 90° C. to about 200° C. for about 1 hour to about 10 hours. Similarly, the dried extrudate can be calcined at any suitable temperature for any appropriate time. However, it is preferred to calcine the dried extrudate at a temperature in the range of from about 500° C. to about 800° C. for from about 10 minutes to about 5 hours. In an alternative embodiment, the alkaline earth metal oxide source is added by being impregnated onto the calcined extrudate and the thus-impregnated extrudate is then dried and calcined. In both embodiments, a catalyst is produced, and its activity can be measured by its ability to convert 4-methyl-1-pentene (4MP1) to 4-methyl-2-pentene (4MP2).

The reactants useful in carrying out the process of the invention to produce the inventive catalysts are acids, refractory metal oxide supports, alkaline earth metal oxides and alkali metal oxides.

Both organic and inorganic acids are generally useful for carrying out this invention. Examples of such organic acids are formic acid, citric acid, oxalic acid and acetic acid. Acetic acid is the preferred organic acid. Examples of inorganic acids useful in this invention are sulfuric acid, hydrochloric acid, nitric acid, phosphoric acid and the like. Nitric acid and phosphoric acid are the preferred members of this group.

All alkali metal compounds are potentially useful on the alkali metal oxide source. Examples of such suitable alkali metal compounds include the halides, sulfides, sulfates, nitrates, carbonates, oxylates, and the like, and mixtures of any two or more thereof.

Exemplary alkali metal oxide source, when optionally employed as a separate ingredient, include lithium nitrate, sodium nitrate, potassium nitrate, cesium nitrate, lithium carbonate, sodium carbonate, potassium carbonate, lithium oxalate, sodium oxalate, potassium oxalate, lithium hydroxide, sodium hydroxide, potassium hydroxide, lithium chloride, lithium iodide, lithium bromide, sodium chloride, sodium iodide, potassium chloride, potassium iodide, and the like, and mixtures of any two or more thereof. Sodium hydroxide is the preferred member of this group.

Likewise, all alkaline earth metal oxides or alkaline earth metal compounds capable of calcining to the oxide are suitable for the practice of this invention. The preferred alkaline earth metal oxide source is one containing magnesium. Exemplary magnesium oxide sources include magnesium nitrate, magnesium carbonate, magnesium oxalate, magnesium hydroxide, magnesium chloride, and the like, as well as mixtures of any two or more thereof. Magnesium nitrate is the preferred member of this group.

Refractory metal oxide supports typically useful in carrying out this invention include but are not limited to alumina, silica, silica-alumina, titania, and the like. Non-preformed alumina is the most preferred member of this group.

The alumina is typically in either the alpha or gamma phase. The gamma phase is, however, preferred. The alumina can be obtained in a powdery form containing about 99 weight percent alumina or in a colloidal form containing about 30 weight percent alumina. The powdery form is preferred because it has a lesser amount of sodium impurity, which in turn minimizes the undesirable skeletal isomerizations caused by such impurities.

Stated generally, aluminas with both high surface area and high pore volumes are preferred. It is expressly noted that boehmite alumina with surface areas of about 290 square meters per gram ($M^2/g$), as measured by mercury surface area techniques, and 0.6 cubic centimeters per gram ($CM^3/g$), as measured by the mercury pore volume method is distinctly preferred. Boehmite alumina with these properties is made and sold by Versal and Kasier Corporations.

Any method and device known in the art for contacting, mixing, and extruding ingredients can be used in the practice of this invention. When using any such method and/or device it is desirable to employ a range of reactants sufficient to result in the following quantities when practicing the preferred embodiment of the invention:

For magnesium oxide, the broad range of elemental magnesium is from about 1 to about 18 weight percent; with a preferred range of from about 6 weight percent to about 15 weight percent; and a most preferred range of from 8 weight percent to 12 weight percent of total catalyst composition. The term total catalyst composition as used herein, refers to the total catalyst product composition at the completion of the preparation process. The catalyst product then will essentially consist of the refractory metal oxide, and alkaline earth metal and alkali metal oxides used in its preparation.

For sodium oxide, the broad range of elemental sodium is from about 0.1 weight percent to about 4 weight percent; with a preferred range of from about 0.2 weight percent to about 3 weight percent; and a most preferred range of from 0.5 weight percent to 2 weight percent of the total catalyst composition.

It is noted that the addition of an alkali metal oxide source as a separate component is not necessary if the refractory metal oxide support to be used contains from about 0.5 weight percent to about 2 weight percent of an alkali metal oxide.

For the acid, the amount to be used is generally determined on the basis of the amount of refractory metal oxide support used. Stated numerically, the broad range of acid typically useful is from about 0.005 lb/lb to about 0.06 lb/lb of refractory metal oxide support, with a preferred range of from about 0.008 lb to about 0.03 lb of acid/lb of refractory metal oxide support, and a most preferred range of from about 0.01 lb to about 0.028 lb of acid/lb of refractory metal oxide support.

For the refractory metal oxide support, herein referred to as inert support, the amount of the pure metal oxide desirable as a component of the inert support, is generally in the range of about 95 weight percent to 100 weight percent, with a preferred range of about 98 weight percent to 100 weight percent, and a distinctly preferred range of about 99 weight percent to 100 weight percent based on the total weight of the inert support.

The quantity of water used in the process of this invention, is directly proportional to the quantity of inert support used. The goal, however, is to use an appropriate balance of these ingredients. Such a balance will contain the desired quantity of water so that paste/extrudate formation is not hindered, and extrudate flow is not hindered due to excessive agglomeration. While the determination of an appropriate water content versus inert support balance can be easily and readily accomplished by one of skill in the art, a ratio of about 0.75 lb to about 0.85 lb of water to 1 lb of inert support is recommended.

After weighing out the desired quantities of reactants in the ranges recited above, preparation of the inventive catalyst can be accomplished by mixing the acid, the alkali metal oxide source, the alkaline earth metal oxide source, and the inert support, and water in a vessel in any convienent order, preferably as disclosed in Example I and Example II, for a period of time sufficient to achieve thorough mixing. The mixture can then be extruded, dried, and calcined. The water and acid used are evaporated during the drying and/or calcining steps. A catalyst is produced, and its activity can be measured by its ability to convert 4MP1 to 4MP2.

This process results in a better catalyst product, reduced nitrous oxides emission during catalyst preparation due to the non-use of sodium nitrate, reduced preparation steps and costs, and in improved extrudability of the catalyst product.

In carrying out isomerization reactions with the catalyst of the invention, suitable reaction conditions or isomerization conditions can be used which effectively cause double bond isomerization of the olefins present in the feed. In general, the temperature at which the isomerization is affected with this catalyst is about 150° C. to about 600° C. Preferably, the temperature will be in the range of 250° C. to 500° C. Reaction pressure can vary appreciatively and can be either super- or sub-atmospheric. Generally, reaction pressure will not exceed about 40 atmospheres in order to avoid condensation reactions that ultimately lead to excessive coke formation on the catalysts. Preferably, a reaction pressure in the range of atmospheric pressure up to about 1000 psig will be employed for the most favorable trade-off between rate of reaction, operation and equipment costs, etc.

Aliphatic mono-and polyenes having more than 3 carbon atoms are amendable to isomerization or disproportionation treatment employing the catalyst to this invention, including cyclic compounds in branch chain as well as normal chain compounds. In general, olefins suitable for treatment in accordance with the present invention are aliphatic or alicyclic olefinic hydrocarbons having from 4 to about 30 carbon atoms, inclusive. Preferably, the practice of the isomerization embodiment of the present invention is carried out with the feed comprising mono-olefinic hydrocarbons.

The catalyst of the present invention can also be admixed with a disproportionation catalyst. The addition of the invention isomerization catalyst to a disproportionation catalyst provides increased olefin feed conversion compared to disproportionation reactions employing disproportionation catalyst alone. The use of isomerization catalyst in disproportionation reactions is known and described in U.S. Pat. No. 4,754,098, the disclosure of which is herein incorporated by reference. The disproportionation process of the present invention comprises contacting at least one olefin selected from the group consisting of acylic mono- and poly-enes having at least three and up to thirty carbon atoms per molecule and cycloalkyl and aryl derivatives thereof, cyclic mono- and poly-enes having at least four and up to thirty carbon atoms per molecule and alkyl and aryl derivatives thereof, mixtures of two or more of the above olefins and mixtures of ethylene with one or more of the above olefins capable of undergoing disproportionation with the mixture of disproportionation catalyst and the isomerization catalyst prepared according to the invention. The reaction temperatures can vary depending upon the catalysts and feeds employed and upon the desired reaction products. Typically, the disproportionation reaction is carried out at a temperature in the range of about 0° C. to about 600° C. Preferably, for good conversion in relatively short reaction times, temperatures of from 20° C. to about 500° C. are employed. The disproportionation reaction can be carried out by contacting the olefins to be disproportionated with the catalyst in the liquid phase or the gas phase depending on the structure of the molecular weight of the olefins. Pressure during the disproportionation reaction can vary between wide limits, for example, pressure between 0.1 atmosphere and 500 atmospheres are suitable, although preferred pressures are between about 1 atmopshere and 40 atmospheres because good conversions are obtained with readily available equipment.

The following examples further illustrate the various aspects of this invention.

Control I

This example illustrates a process for making MgO catalyst for a gas phase isomerization and the activity of the catalyst prepared therefrom.

To a clean paste tub, 50 lb. of magnesium oxide and 1194 grams of silica were added. The mixture was mixed for 1 minute at low speed followed by 2 minutes at a fast speed using a pony mixer. Immediately thereafter 65 lb. of deionized water was quickly added followed by mixing for an additional minute. The paste was distributed onto five trays and dried at 40°–45° C. in a dryer to 12–15 weight percent moisture.

The "dried" paste was ground and passed through a 16 mesh stainless steel screen and then blended in a drum roller. The blended granules were fed into a rotary pelletizer where they were pressed into pellets. These pellets were then fed into a rotary calciner at 85 lb/hr and calcined at 500° C. for 1 hour.

The pelletized and calcined catalyst (15 grams) was loaded into a pipe reactor (18 in × ½ in) and activated for 3 hours at 450° C. under $N_2$ gas. Isomerization was then started by continuously feeding 4-methyl-1-pentene (4MP1) at a rate of 2.0 ml/min, through a guard bed packed with 50 grams of 3A molecular sieves and 50 grams of 13X molecular sieves, to the reactor. The reactor was operated under 100 psig pressure and initial temperature at 150° C. The reactor temperature was raised to 200° C. after 2.5 hours and further raised to 250° C. after 5.5 hours. At time intervals, a portion of the reactor effluent was sampled and analyzed for 4MP1 and its isomerized product, 4-methyl-2-pentene (4MP2) with a gas chromatography. The results are shown in Table 1.

TABLE 1

| | Isomerization of 4MP1 to 4MP2 | | | | | | | |
|---|---|---|---|---|---|---|---|---|
| Time (hr) | ½ | 1½ | 2½ | 3½ | 4½ | 5½ | 6½ | 7½ |
| 4MP1 (wt %) | 88.53 | 93.98 | 100 | 85.51 | 82.88 | 83.09 | 65.77 | 56.56 |
| 4MP2 (wt %) | 8.26 | 6.02 | 0 | 16.49 | 17.12 | 16.91 | 34.23 | 43.44 |

TABLE 1-continued

| | Isomerization of 4MP1 to 4MP2 | | | | | | | |
|---|---|---|---|---|---|---|---|---|
| Time (hr) | ½ | 1½ | 2½ | 3½ | 4½ | 5½ | 6½ | 7½ |
| Others (wt %)[a] | 3.22 | | | | | | | |

[a]Others include 2-methyl-2-pentene and an unidentified peak on GC.

Isomerization activity as measured from the catalyst of Control 1 and from the catalyst of subsequent examples is primarily the ability of the catalyst to move olefin double bonds only. It is only the magnesium oxide component of the catalyst which has useful isomerization properties.

The results indicate that, after 7.5 hours, only 43.44% of reactant 4MP1 was converted to product 4MP2.

EXAMPLE I

This example illustrates that the inventive process to prepare isomerization catalyst which has a superior activity than that illustrated in Example I.

To 2.25 lb. of water, 23.85 grams of NaOH was added. To this sodium hydroxide solution, 0.04 lb. of concentrated $HNO_3$ was added. The resulting solution was immediately added to a mix muller containing 2.79 lb. of alumina, and the mixture was mixed for 15 min. followed by aging for 30 minutes at room temperature. The wet paste was then extruded using a ⅛ in. die. The extrudate, after drying in an oven at 140° C. for 3 hours, was fed to a rotary calciner and calcined for 1 hour at 635° C.

A portion of the extrudate (0.669 lb.) was placed in a metal tray. To this tray was added 0.7359 lb. of magnesium nitrate mix, which was obtained by dissolving 18.75 lb. of $Mg(NO_3)_2$ with 9 lb. of water. The tray was then allowed to stand for 5 minutes at room temperature to impregnate $Mg(NO_3)_2$ onto the extrudate. The impregnated extrudate was then dried for 3 hours at 140° C. and calcined at 635° C. for 1 hour in a rotary calciner.

The calcined impregnated extrudate was tested for isomerization activity as described in Control I. The results are shown in Table 2.

TABLE 2

| | Isomerization of 4MP1 to 4MP2 | | | | | | | |
|---|---|---|---|---|---|---|---|---|
| Time (hr) | 1 | 1.5 | 2.5 | 3.5 | 4.5 | 5.5 | 6.5 | 7.5 |
| 4MP1 (wt %) | 100 | 100 | 100 | 77.08 | 72.80 | 71.73 | 26.51 | 24.59 |
| 4MP2 (wt %) | | | | 22.92 | 27.07 | 28.13 | 70.17 | 71.59 |
| Others (wt %)[a] | | | | | 0.13 | 0.14 | 3.02 | 3.53 |

[a]Others include 2-methyl-2-pentene and an unidentified peak on GC.

The results shown in Table 2 indicate that after 7.5 hours, 75.41% of the initial 4MP1 was converted and 71.59% 4MP2 was obtained. Table 2 clearly shows that the inventive catalyst prepared by the inventive process has superior activity to that illustrated in Control I.

EXAMPLE II

This example illustrates another process for preparing the isomerization catalyst of the invention.

The experiment was carried out by mixing alumina (2.79 lb.) and $Mg(NO_3)_2$ (2.09 lb.) for 15 minutes in a mix muller. To this mix, a solution comprising NaOH (0.053 lbs.), $HNO_3$ (0.04 lb.) and $H_2O$ (1.00 lb.) was added and the ingredients were further mixed for another 15 minutes. The paste was then extruded and the extrudate was dried for 3 hours at 140° C. and calcined for 1 hour at 635° C. The calcined extrudate was tested for isomerization activity as described in Control I. The results are shown in Table 3.

TABLE 3

| Time (hr) | Isomerization of 4MP1 to 4MP2 | | | | | | | |
|---|---|---|---|---|---|---|---|---|
| | 1 | 2 | 3 | 4 | 5 | 6 | 7 | 8 |
| 4MP1 (wt %) | 87.03 | 87.53 | 85.29 | 83.53 | 71.69 | 77.98 | 40.46 | 39.51 |
| 4MP2 (wt %) | 12.38 | 12.47 | 14.71 | 16.42 | 28.31 | 22.02 | 58.07 | 58.27 |
| Others (wt %)[a] | 0.60 | | | | | | 1.20 | 1.97 |

[a]Others include 2-methyl-2-pentene and an unidentified peak on GC.

As shown in Table 3, the catalysts prepared by the process of Example II had higher activity and better 4MP2 selectivity with a conversion increase of 33.68% after 7 hours over the conversion of the process of Control I after 7.5 hours. However, when compared to Table 2 it is clear that the process described in Example I produces catalysts with even better catalyst activity. The catalyst prepared by the process of Example I shows an increase in conversion of 64.80% after 7.5 hours over the conversion of the catalyst prepared by the process of Control 1 after 7.5 hours.

While this invention has been described in detail for the purpose of illustration, it is not to be construed as limited thereby but is intended to cover all changes and modifications within the spirit and scope thereof.

That which is claimed is:

1. A process for preparing a catalyst comprising:
   (a) mixing an alkaline earth metal oxide source, an alkali metal oxide source, a refractory metal oxide support, at least one acid, and water to form a paste;
   (b) extruding said paste to produce an extrudate; and
   (c) thereafter drying said extrudate to produce a dried extrudate.

2. A process in accordance with claim 1 wherein step (a) comprises:
   mixing said alkaline earth metal oxide source and said refractory metal oxide support to form a mixture, adding said alkali metal oxide source, said at least one acid and said water to said mixture and mixing to form said paste.

3. A process according to claim 1 comprising the additional step of:
   (d) calcining said dried extrudate to produce a calcined catalyst.

4. A process in accordance with claim 1 wherein said at least one acid comprises an organic acid.

5. A process according to claim 4 wherein said organic acid is selected from the group consisting of oxalic acid, formic acid, citric acid, and acetic acid.

6. A process in accordance with claim 4 wherein said organic acid is acetic acid.

7. A process in accordance with claim 1 wherein said at least one acid is an inorganic acid.

8. A process in accordance with claim 7 wherein said inorganic acid is selected from the group consisting of sulfuric acid, hydrochloric acid, phosphoric acid, and nitric acid.

9. A process in accordance with claim 7 wherein said inorganic acid is nitric acid.

10. A process in accordance with claim 1 wherein said alkali metal oxide source is selected from the group consisting of lithium, sodium and potassium hydroxides and mixtures of any two or more thereof.

11. A process in accordance with claim 1 wherein said alkali metal oxide source is sodium hydroxide.

12. A process in accordance with claim 1 wherein said alkaline earth metal oxide source is selected from the group consisting of Group IIA metal oxides and Group IIA metal compounds capable of being calcined to their respective oxides and mixtures of any two or more thereof.

13. A process in accordance with claim 1 wherein said alkaline earth metal oxide source is magnesium nitrate.

14. A process in accordance with claim 1 wherein said refractory metal oxide support is selected from the group consisting of alumina, silica-alumina, silica, titania and mixtures of two or more thereof.

15. A process in accordance with claim 1 wherein said refractory metal oxide support is non-preformed gamma phase boehmite alumina.

16. A process in accordance with claim 1 wherein step (a) comprises:
   mixing said alkaline earth metal oxide source and said refractory metal oxide support to form a mixture; and
   mixing said alkali metal oxide source, said at least one acid and said water with said mixture to form said paste; and
   wherein said process comprises the additional step of:
   (d) calcining said dried extrudate to produce a calcined catalyst.

17. A process in accordance with claim 16 wherein:
   said alkaline earth metal oxide source is magnesium nitrate;
   said alkali metal oxide source is sodium hydroxide;
   said at least one acid is nitric acid; and
   said refractory metal oxide support is alumina.

18. A process for the preparation of a catalyst comprising:
   (a) mixing an alkali metal oxide source, a refractory metal oxide support, at least one acid and water to form a paste;
   (b) extruding said paste to form an extrudate;
   (c) drying said extrudate to form a dried extrudate;
   (d) calcining said dried extrudate to form a calcined extrudate;
   (e) impregnating said calcined extrudate with an alkaline earth metal oxide source to form an impregnated extrudate; and
   (f) drying said impregnated extrudate to form a dried impregnated extrudate.

19. A process according to claim 18 comprising the additional step of:
   (g) calcining said dried impregnated extrudate to form a calcined catalyst.

20. A process in accordance with claim 18 wherein said at least one acid comprises an organic acid.

21. A process in accordance with claim 20 wherein said organic acid is selected from the group consisting of oxalic acid, formic acid, citric acid and acetic acid.

22. A process in accordance with claim 20 wherein said organic acid is acetic acid.

23. A process in accordance with claim 18 wherein said at least one acid is an inorganic acid.

24. A process in accordance with claim 23 wherein said inorganic acid is selected from the group consisting of sulfuric acid, hydrochloric acid, phosphoric acid and nitric acid.

25. A process in accordance with claim 23 wherein said inorganic acid is nitric acid.

26. A process in accordance with claim 18 wherein said alkali metal oxide source is selected from the group consisting of lithium, sodium potassium hydroxides and mixtures of any two or more thereof.

27. A process in accordance with claim 18 wherein said alkali metal oxide source is sodium hydroxide.

28. A process in accordance with claim 18 wherein said alkaline earth metal source is selected from the group consisting of Group IIA metal oxides and Group IIA metal compounds capable of being calcined to their respective oxides and mixtures of any two or more thereof.

29. A process in accordance with claim 18 wherein said alkali metal oxide source is magnesium nitrate.

30. A process in accordance with claim 18 wherein said refractory metal oxide support is selected from the group consisting of alumina, silica alumina, silica, titania and mixtures of two or more thereof.

31. A process in accordance with claim 18 wherein said refractory metal oxide support is non-preformed gamma phase boehmite alumina.

32. A process in accordance with claim 31 wherein:
said acid is nitric acid;
said alkali metal oxide source is sodium hydroxide; and
said alkaline earth metal oxide source is magnesium nitrate.

* * * * *